United States Patent
Koster et al.

(10) Patent No.: US 10,545,554 B2
(45) Date of Patent: Jan. 28, 2020

(54) RESOURCE METERING SYSTEM AND METHOD USING SUCH A SYSTEM FOR SMART ENERGY CONSUMPTION

(75) Inventors: Robert Paul Koster, Eindhoven (NL); Klaus Kursawe, Eindhoven (NL); Alphons Antonius Maria Lambertus Bruekers, Nederweert (NL); Paulus Mathias Hubertus Mechtildis Anton Gorissen, Eindhoven (NL); Ileana R. Buhan, The Hague (NL); Petrus Johannes Lenoir, 'S Hertogenbosch (NL); Sye Loong Keoh, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 730 days.

(21) Appl. No.: 13/884,286

(22) PCT Filed: Oct. 24, 2011

(86) PCT No.: PCT/IB2011/054733
§ 371 (c)(1),
(2), (4) Date: Jul. 29, 2013

(87) PCT Pub. No.: WO2012/063155
PCT Pub. Date: May 18, 2012

(65) Prior Publication Data
US 2013/0297087 A1 Nov. 7, 2013

(30) Foreign Application Priority Data
Nov. 10, 2010 (EP) .................................... 10306240

(51) Int. Cl.
*G06F 1/32* (2019.01)
*H02J 3/14* (2006.01)
*H04Q 9/00* (2006.01)

(52) U.S. Cl.
CPC .................. *G06F 1/32* (2013.01); *H02J 3/14* (2013.01); *H02J 2003/143* (2013.01); *Y04S 20/222* (2013.01)

(58) Field of Classification Search
CPC ..... G06F 1/32; H02J 3/008; H02J 3/14; H02J 2003/143; H04Q 9/00; H04Q 2009/43;
(Continued)

(56) References Cited

U.S. PATENT DOCUMENTS 4,321,477 A * 3/1982 Bartlett .................. H02J 3/14
307/126
5,684,469 A * 11/1997 Toms ................... A47B 83/001
312/223.6
(Continued)

FOREIGN PATENT DOCUMENTS

CN 101052262 A 10/2007
EP 2026299 A1 2/2009
(Continued)

*Primary Examiner* — Jennifer L Norton
(74) *Attorney, Agent, or Firm* — Daniel J. Piotrowski

(57) ABSTRACT

The resource metering system comprises: an end-point device (25) consuming a resource, in particular for usage in a building (2) or in an outdoor lighting system, said device comprising a detection unit that produces status information and an indicator of usefulness; a smart meter (20) comprising: a communication circuitry provided with an interface adapted for receiving from said device status information and said indicator of usefulness; a metrology device connected to a medium (17) that provides the resource to said device; and a control circuitry connected to the metrology device for collecting resource consumption data, the control circuitry being connected to the communication circuitry and adapted to produce monitoring data to be securely transmitted to a server (10) after processing the status information and said indicator. Monitoring data are used
(Continued)

when determining consumption tariffs, so as to encourage energy efficient usage of the device.

14 Claims, 2 Drawing Sheets

(58) Field of Classification Search
CPC ............ H04Q 2009/60; Y02B 70/3225; Y04S 20/222
USPC ................................ 700/286, 291, 295, 297
See application file for complete search history.

(56) References Cited

U.S. PATENT DOCUMENTS

| | | | | |
|---|---|---|---|---|
| 9,507,362 | B2* | 11/2016 | Weaver | H02J 3/14 |
| 2003/0063723 | A1* | 4/2003 | Booth | H02J 3/14 |
| | | | | 379/106.03 |
| 2003/0193405 | A1* | 10/2003 | Hunt | G01D 4/004 |
| | | | | 340/870.02 |
| 2003/0233201 | A1* | 12/2003 | Horst | H02J 3/14 |
| | | | | 700/295 |
| 2004/0243524 | A1* | 12/2004 | Crichlow | G01D 4/004 |
| | | | | 705/412 |
| 2008/0272934 | A1* | 11/2008 | Wang | H02J 3/14 |
| | | | | 340/870.11 |
| 2009/0063228 | A1* | 3/2009 | Forbes, Jr. | G01D 4/004 |
| | | | | 705/7.25 |
| 2009/0177294 | A1* | 7/2009 | Baraty | G06Q 20/382 |
| | | | | 700/36 |
| 2009/0212971 | A1* | 8/2009 | Casey | G08B 27/005 |
| | | | | 340/870.02 |
| 2010/0082792 | A1* | 4/2010 | Johnson | G01D 4/004 |
| | | | | 709/223 |
| 2010/0088261 | A1* | 4/2010 | Montalvo | H02J 3/14 |
| | | | | 706/15 |
| 2010/0100253 | A1* | 4/2010 | Fausak | G01D 4/002 |
| | | | | 700/295 |
| 2010/0179862 | A1* | 7/2010 | Chassin | G06Q 10/06 |
| | | | | 705/412 |
| 2010/0191487 | A1* | 7/2010 | Rada | G05F 1/70 |
| | | | | 702/60 |
| 2010/0295473 | A1* | 11/2010 | Chemel | H05B 37/029 |
| | | | | 315/294 |
| 2010/0305772 | A1* | 12/2010 | Rodgers | G01D 4/004 |
| | | | | 700/295 |
| 2011/0077789 | A1* | 3/2011 | Sun | H02J 3/14 |
| | | | | 700/291 |
| 2011/0153107 | A1* | 6/2011 | Kim | G06F 1/3203 |
| | | | | 700/295 |
| 2011/0196547 | A1* | 8/2011 | Park | G06Q 50/06 |
| | | | | 700/296 |
| 2011/0270452 | A1* | 11/2011 | Lu | G05B 19/042 |
| | | | | 700/291 |
| 2011/0313964 | A1* | 12/2011 | Sanchey Loureda | G01D 4/002 |
| | | | | 706/50 |
| 2012/0022711 | A1* | 1/2012 | Sakaguchi | H02J 13/0017 |
| | | | | 700/295 |
| 2012/0215370 | A1* | 8/2012 | Seo | H04L 12/12 |
| | | | | 700/296 |
| 2012/0259476 | A1* | 10/2012 | Trieb | G06F 1/28 |
| | | | | 700/295 |
| 2013/0332002 | A1* | 12/2013 | Seo | A47L 15/0047 |
| | | | | 700/295 |
| 2014/0009114 | A1* | 1/2014 | Nishio | B60L 11/1844 |
| | | | | 320/109 |
| 2014/0303802 | A1* | 10/2014 | Burckard | H04L 12/282 |
| | | | | 700/295 |
| 2015/0303691 | A1* | 10/2015 | Forbes, Jr. | G06Q 10/00 |
| | | | | 700/295 |
| 2016/0322820 | A1* | 11/2016 | Nakayama | G06Q 50/06 |
| 2017/0308968 | A1* | 10/2017 | Zhou | G06Q 50/06 |
| 2018/0364689 | A1* | 12/2018 | O'Brien | G06Q 50/06 |
| 2018/0372507 | A1* | 12/2018 | Luan | H04L 29/08 |
| 2019/0101576 | A1* | 4/2019 | Sharp | G01R 22/066 |
| 2019/0124424 | A1* | 4/2019 | Torpy | G01D 4/008 |
| 2019/0158712 | A1* | 5/2019 | Verfuerth | H05B 37/0272 |
| 2019/0163468 | A1* | 5/2019 | Enns | H04L 29/08729 |

FOREIGN PATENT DOCUMENTS

| | | | | |
|---|---|---|---|---|
| FR | 2159749 | A1 * | 3/2010 | ............ G01D 4/002 |
| GB | 2464634 | A * | 4/2010 | ............ G01D 4/002 |
| JP | 11120473 | A | 4/1999 | |
| JP | 2003333768 | A | 11/2003 | |
| JP | 2007287671 | A | 11/2007 | |

* cited by examiner

RESOURCE METERING SYSTEM AND METHOD USING SUCH A SYSTEM FOR SMART ENERGY CONSUMPTION

FIELD OF THE INVENTION

The present invention relates generally to resource consumption measuring meters. It relates more particularly to resource metering systems provided with a data recorder and adapted to transfer collected data to a central database. The invention also relates to a method using an energy meter for smart energy consumption.

BACKGROUND OF THE INVENTION

Energy efficiency and conservation are becoming an increasingly important issue because the demand for energy is constantly increasing, while the dominant energy supplies—various types of fossil fuels—are steadily dwindling. As a result, energy costs will only grow with time, steadily gaining a larger percentage of both residential and commercial building budgets. In addition, because the majority of energy is produced from fossil fuels, the increased use of this energy source adversely affects the environment, contributing to global warming through the release of carbon oxide gases. Improvements in energy efficiency are most often achieved by adopting a more efficient technology or processes, although changes in individual behavior may also result in reduced energy use.

For many years, complicated, expensive systems have been used to lower the usage and costs of energy. However, these approaches have proved to be too expensive and complicated for small businesses and residential consumers. As a result, consumers are not concretely incited to lower the energy consumption.

A challenge faced by the utilities and consumers in attempting to reduce energy consumption (gas and/or electric), is the lack of efficient and real-time measures for encouraging sustainable behavior of the actual consumer. For instance, it would be of value to the consumer to know that any action lowering or optimising energy consumption is taken into account by the central station and the associated billing system. Some automatic meter reading systems can be used to control quantitative data related to the energy consumption. Automatic meter reading systems are typically provided with a communication module, for instance a wireless module, and comprise a battery-powered encoder that collects meter readings, the collected data being periodically transmitted over a communication network to a central station.

Today's systems eventually provide some pieces of information back to the consumer, for instance on command by the consumer or real-time through a specific apparatus for reading real-time consumption data. A back-office solution called "AMR Hosting" allows a user to track his/her electricity, water, or gas consumption over the Internet. All data is collected in near real-time, and is stored in a centralized database by high-end data acquisition software. The user can view the data via a secure web application, and can analyze the data using various online analysis tools. The user can easily chart load profiles, analyze tariff components, and verify his/her utility bill. Google™ PowerMeter is an example of this type of web-based tool.

However, it would be useful to offer in a variety of settings (i.e., building environments/conditions), including home and office, a large freedom to the consumers, while encouraging an optimized energy consumption of the home appliances and light sources.

Accordingly, there is a need for an automatic energy metering system for collecting data from metering units located close to the point of use or consumption, which efficiently incites the consumer to have a better behavior when using energy and does not fail to respect user priorities.

SUMMARY OF THE INVENTION

The object of the invention is therefore to meet this expectation of both utilities and users.

Embodiments of the present invention provide a method according to claim 1 for transmitting to a server monitoring data concerning usage of at least one end-point device. The monitoring data may represent information about usefulness (qualitative information) of the consumed electrical power for said end-point device.

In particular, in accordance with a first aspect of the invention, a method is provided for transmitting to a server monitoring data concerning usage by a consumer of at least one end-point device consuming at least one resource, the method comprising the steps of:

associating said end-point device to a smart meter by interfacing said end-point device with a communication circuitry of the smart meter;

collecting by the smart meter resource consumption data representative of the resource consumed by said end-point device;

collecting status information and at least one indicator of usefulness from said end-point device by the smart meter, said indicator of usefulness being distinct from resource consumption data;

processing both the status information and said indicator of usefulness to produce the said monitoring data; and transmitting, by said smart meter, the resource consumption data and the monitoring data to the server.

In exemplary embodiments, the resource may water, hot water, cold water, or steam delivered to the end-point device through a medium, typically a pipe. It is also possible that the resource is gas, or petroleum, or hydrogen or likewise, brought by a pipe. Or, as explained in greater details in the embodiments depicted on the drawings, the resource may also be electricity delivered by wires to the end point device.

Therefore, due to transparency of the transmission of monitoring data, the method does not generate constraints for consumers who can freely choose the usage of end-point devices (domestic appliances, electric car and light for instance). The method is helpful for reducing energy use because billing system of utilities can advantageously take into account the user behavior. In this example, the user will be financially incited to adopt a sustainable behavior.

In one particular embodiment of the invention, the indicator of usefulness is based on a measure of a sensor of the end-point device. For instance, the indicator of usefulness may be extracted by a processing module of the end-point device coupled to said sensor. When the end-point device is a LED light source and the sensor is a presence sensor, the output signal of the presence sensor is indicative for the presence of one or more people in the vicinity and hence for the usefulness or efficiency of the light that is generated. Here, there is no feedback loop provided between sensor-tracked user behavior and device output, so that the user is not submitted to any technical constraints (no direct action to an output of the end-point device).

Various embodiments of the method of the invention are described in claims 3 through 17 and are included accordingly in this specification.

One object of the present invention is also to provide a resource metering system suitable for increasing smart usage of end-point devices consuming a resource.

Accordingly, it is further proposed according to the invention a resource metering system according to claim 18.

The indicator of usefulness retrieved by the smart meter for electricity can be representative of a value and deprived from sensitive information that can be harmful from the perspective of user privacy. In addition or alternatively, the reading by the smart meter protects the privacy of the users, the energy pattern recorded and transmitted to a server by the smart meter being processed such that extracting privacy sensitive information is not possible.

One object of the present invention is also to provide a lamp suitable for collecting data pertinent for incitation of smart usage of the lamp.

Accordingly, it is further proposed according to the invention an electrically powered lamp according to claim 20.

Other features and advantages of the invention will become apparent to those skilled in the art during the description which will follow, given by way of a non-limiting example, with reference to the appended drawings.

DETAILED DESCRIPTION OF EMBODIMENTS

In the various figures, the same references are used to designate identical or similar elements.

Figure 1:
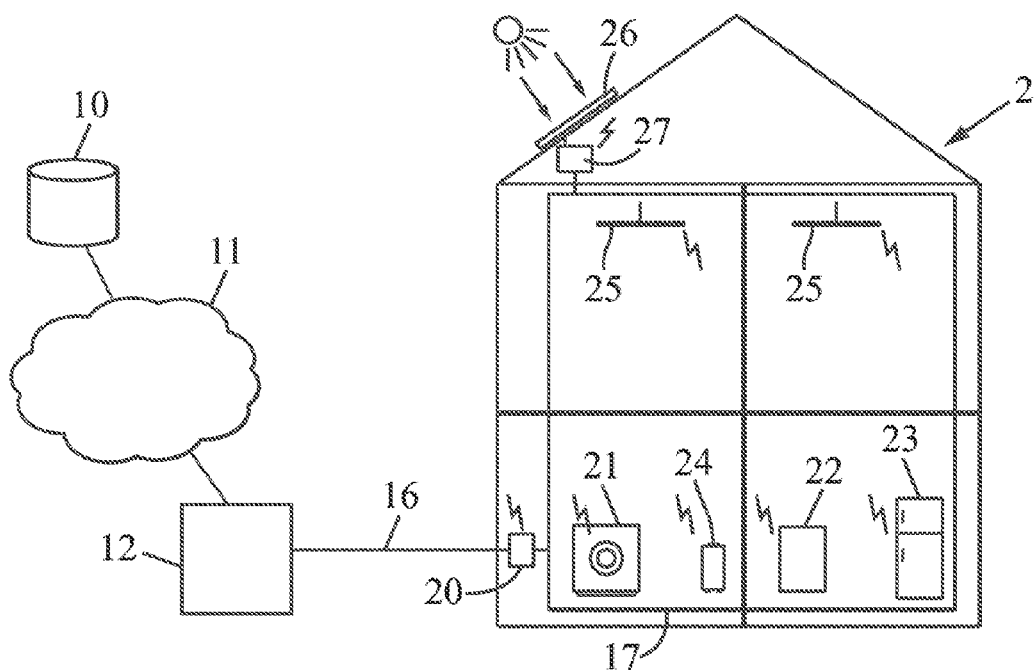
FIG. 1 illustrates a home equipped with an energy metering system.

FIG. 1 illustrates a home 2 or similar building (for instance factory), in which embodiments of the invention herein described may be used. At least one server 10 of an electricity supplier is connected to the Internet 11 or similar network. Home 2 and other homes or factories (not shown) are connected via a main power line to a substation 12. From this, home 2 draws its power from the national grid 14. Substation 12 typically comprises a concentrator which receives signals from the homes sent down the power lines and forwards them in a suitable format to Internet 11. Each substation 12 can typically serve one hundred to two hundred properties, although only one is shown here.

It is understood that Internet 11 may be replaced by any other suitable communication network. For instance, wireless communication can be used using a wireless mesh network. More generally, any communication method can be used (with WiMax radio, Ethernet, a telephone modem, ASDL broadband or any other).

In the network shown in FIG. 1, it is possible for devices within homes or places of business to communicate securely with the servers. Here, home 2 comprises several end-point devices that communicate with the server. Electricity is provided to home 2 via main power line 16, and premises electricity wiring 17 provides power to devices in the home 2. Smart meter 20 monitors the electricity usage and communicates with electricity supplier server 10 to provide details of usage. Smart meter 20 includes a wireless communications interface for the purpose of communicating with other devices in the home 2.

End-point devices in the home, for instance a washing machine 21, a dish washer 22, a refrigerator 23, charging device 24 for batteries of an electrical car (or batteries of another electrically motorized vehicle), air conditioning appliances, pumps, LED light sources 25 communicate with smart meter 20. Solar array 26 and transformer 27 provide additional power to the house that can be exported to the national grid 14 if necessary. Here, each of these devices communicates wirelessly with smart meter 20, although communication via the wiring 17 would also be possible for those devices that are connected to it. One or more of the end-point devices may form part of an outdoor lighting system connected to the home 2 or similar building. Alternatively, all the end-point devices correspond to lightening devices of an outdoor lighting system and communicate with a smart meter 20.

One or more of these local devices communicate with the associated server 10 via the smart meter 20. Thus the smart meter 20 is used to enable communication between many household devices and at least one associated server 10. Here, the end-point devices are each associated to a unique smart meter 20. Each communication link is preferably separate and secure, so that smart meter 20 cannot be tampered with by a user, and that data produced by, received by or stored by any of the devices is not accessible by any third party, including the makers of other devices in the home and owners of servers which are not associated with the communicating end-point devices.

Figure 2:
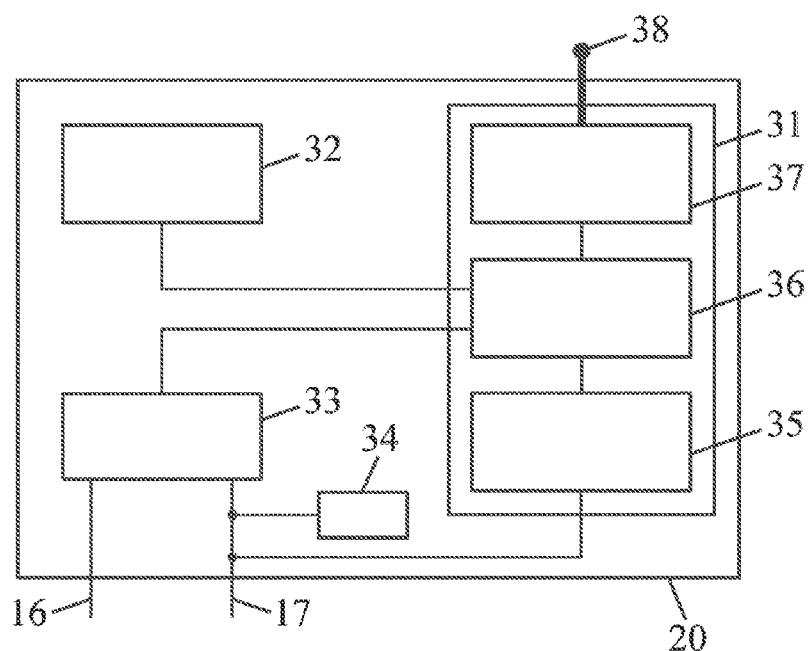
FIG. 2 is a block diagram of a smart meter shown in FIG. 1.

As shown in FIG. 2, smart meter 20 comprises a communication circuitry 31, a user interface 32, a metrology device 33 and a power supply unit 34. Antenna 38 for wireless communication is linked to communications block forming the communication circuitry 31, which here comprises a Wide Area Network (WAN) interface 35, a secure microcontroller 36 and a Local Area Network (LAN) interface 37. Secure microcontroller 36 is connected to each of the other elements of the smart meter 20. Antenna 38 is optional as local communication could be performed in a different way, for instance Metrology device 33 connects between the incoming mains electricity 16 and the premises electricity wiring 17, and measures the electricity consumption within house 2. The smart meter 20 thus collects energy consumption data representative of all or part of the electricity consumed by the endpoint devices. Collecting may be performed automatically. Information regarding electricity usage can optionally be displayed to a user on user interface 32. Preferably, not only consumption data are intended to be used for determining consumption prices. Qualitative data concerning usage of the end-point devices and representative of the way energy is used are also collected as described hereafter. The power supply unit 34 provides a low voltage power supply for the electronics in the smart meter 20 from the incoming power line 16. In this embodiment, WAN interface 35 facilitates communication via power line 16. LAN interface 37 facilitates communication wirelessly, using a protocol such as ZigBee™. Thus any communication between one of the local devices and one of the servers is routed through microcontroller 36. A secure connection is provided between the LED light sources 25 or other end-point device and the smart meter 20 to prevent errors and fraud (e.g., preventing always benefitting from low price regardless of the way energy is used).

As shown in FIG. 2, the communication circuitry 31 is implemented as a module or sub-system within the smart meter 20. The end-point devices are each associated to the smart meter 20 through interfacing with the communication circuitry 31. The communication circuitry 31 could also be implemented as a set of components soldered to the same printed circuit board as the other components of meter 20. More generally, many other embodiments of the smart meter 20 are possible.

Now referring to FIG. 1, the secure microcontroller 36 or similar control unit of the smart meter 20 is arranged to produce monitoring data about usefulness of one or more of the end-point devices when powered. The WAN interface 35 or similar communication interface is provided for transmitting the monitoring data to the server 10 (here a remote server). The monitoring data comprise locally generated information from a sensor or a routine provided in the end-point device. Such information is representative of usefulness of electricity consumed by the end-point device.

Figure 3:
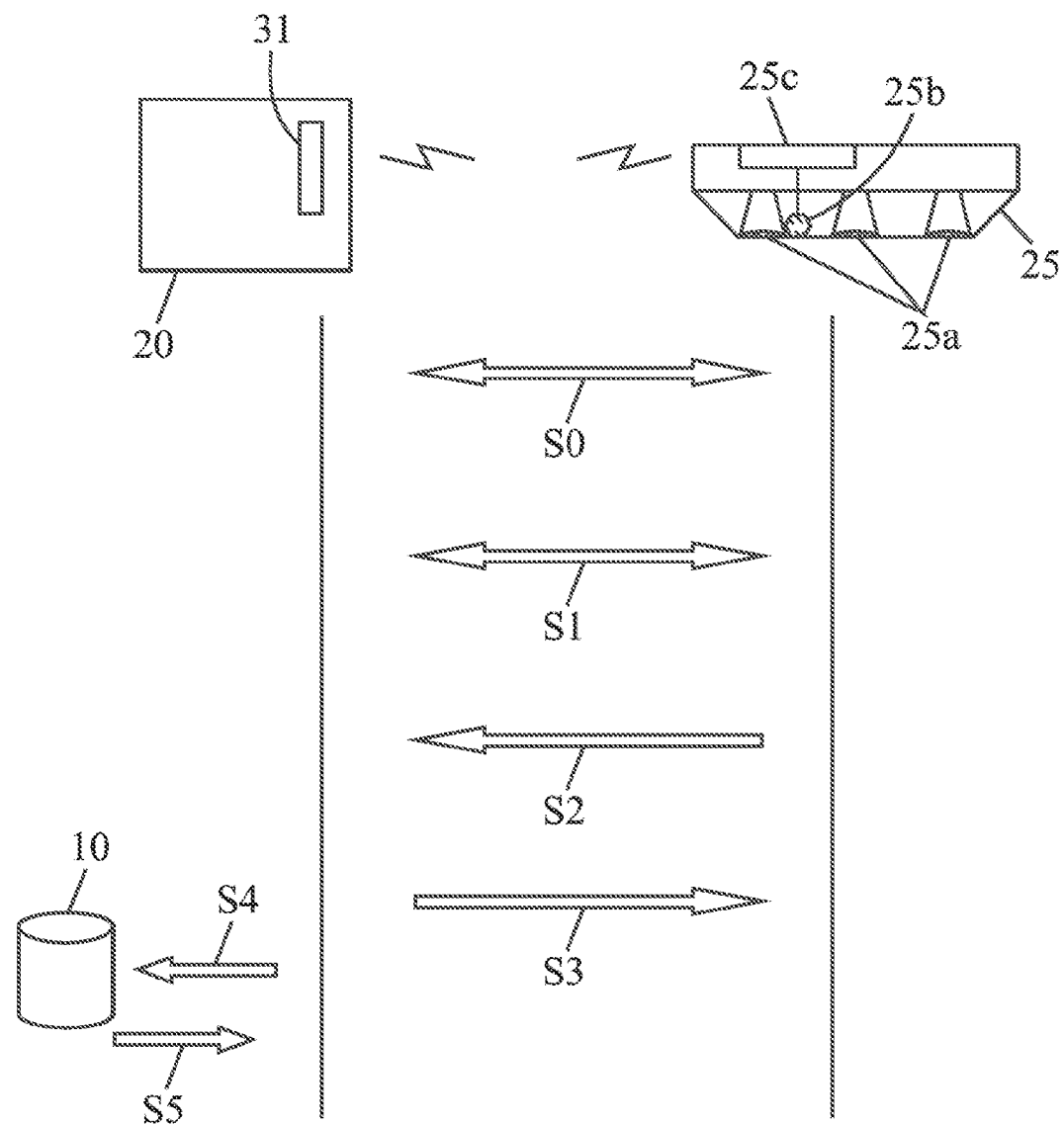
FIG. 3 illustrates a communication protocol used according to one embodiment of the present invention.

As shown in FIG. 3, considering the example of the LED light sources 25 or similar lamps, preferably retro-fit, each device 25 comprises:

at least one lightening component 25a;
a detection unit 25b that produces data including status information (ON/OFF for example) and an indicator of usefulness (occupancy of the place where the light source 25 is installed for example); and
a communication module 25c for transmitting to the smart meter 20 data produced by the detection unit 25b.

In one exemplary embodiment, non-occupancy (e.g. the person is in another room) is detected by a presence sensor of the detection unit 25b. It is understood that the output signal of the presence sensor is indicative for the presence of one or more people in the vicinity and hence for the usefulness or efficiency of the light that is generated. Accordingly, a presence indicator defining an indicator of usage efficiency/usefulness can be generated and take for instance two values: 1 if at least one person is detected and 0 if nobody is detected. Such an indicator of usefulness of the LED light source 25 and a corresponding information status, which may be representative of a power, are processed by the smart meter 20 to determine if the LED light source 25 is used according to an energy saving mode or an energy spoiling mode. One or more information status may be used. In the case of the LED light source 25, information status may be chosen amongst OFF and ON or amongst distinct power levels. It should be noted that the indicator of usefulness is external to energy consumption data and represents a usage level with respect to the energy consumption, i.e. a quality level of energy consumption. This indicator may be obtained after measurement of a physical parameter, which reflects usage of the electrically powered end-point device. It can thus be deduced from the physical parameter that usage is optimized or not (as compared to an expected usage of the device).

The detection unit 25b of the LED light source 25 here comprises a processing unit to extract the relevant information that is subsequently communicated via the communication module 25c to the smart meter 20. Preferably, the LED light source 25 securely transmits through the associated communication module 25c control data to the communication circuitry 31 of the smart meter 20. Data may be encapsulated in frames containing identification information and signals carrying such identification information are transmitted between the communication module 25c and the LAN interface 37 or similar of the communication circuitry 31, so as to protect transmission to the communication circuitry 31. In this example of non-occupancy, monitoring data can include data representative of a non occupancy during operation of LED light source 25 after a predetermined period of non-occupancy.

In one exemplary embodiment, a time control section in the smart meter 20 may control the communication circuitry 31 so as to communicate the monitoring data on frequency different from frequency of control data received from the LED light source 25 or similar end-point device. The time control section can repeat a judgment whether the first communication circuitry 31 has received/recorded the control data. When a waiting period exceeds a threshold, the time control section controls the communication circuitry 31 so as to transmit the transmit information.

To encourage people to switch-off lights when light not needed (e.g. person is in another room), one can set the price of spoiled energy to be higher compared to the price of useful energy. For instance, the server 10 is provided with a billing system connected to a central database and taking into account information about spoiled energy. An indicator of usefulness allows for determination that an excess energy is consumed for the associated end-point device. In this context, a warning function that informs users about spoiling energy is implemented, for instance in the user interface 32 of the smart meter 20 or in a warning device located in the same room as the LED light source 25 or similar lamp, optionally within a housing of the lightening device. The consumer can be notified of an amount of excess energy consumed in association with a date and a time.

In one preferred embodiment, information concerning spoiled energy is communicated to the user in a proper way, for instance via a display of the user interface 32. Of course, the smart meter 20 can also collect consumption data related to old lamps and/or luminaires (retro-fit) that don't have any components for sensing, processing and communication. One tariff only is associated to electricity consumed when an incandescent bulb or similar lamp is on.

In a smart home or in buildings equipped with end-point devices as shown in FIG. 1, smart metering performed by the smart meter 20 may be associated with a specific billing system of the server 10, so as to define tariffs taking into account spoiling of electricity. The energy metering system as shown in FIG. 1 comprises connections between the smart meter 20 and several end-point devices to retrieve status information and indicators of usefulness. The secure microcontroller 36 or similar control circuitry of the smart meter 20 is connected to the metrology device 33 and adapted to collect electricity consumption data in said wiring 17. The secure microcontroller 36 is arranged to distinguish consumption data of the different end-point devices, for instance by using available switch data and/or status information delivered from the endpoint devices. The secure microcontroller 36 produces monitoring data about a powered end-point device after processing the status information and said indicator of usefulness. The monitoring data, including data representative of a quality level of energy consumption for a given end-point device, are then transmitted to the server 10.

Now referring to FIG. 3, communication steps between the LED light source 25 or any other end-point device are performed so as to collect information in-home with respect of privacy. Security is also guaranteed to avoid unintentional leakage of e.g. electricity usage information or control by outsiders over electrical devices in the home 2. Also, privacy is here managed to control sharing of privacy sensitive information with service providers and the utility companies.

As shown in FIG. 1, the smart meter 20 and the LED light source 25 are paired in initial step S0. The smart meter 20 and LED light source 25 exchange basic information about each other's identity, privacy settings and agree on future key material. In one embodiment, the in-home wiring 17 is utilized for the pairing and information is exchange via PCL (Power Line Communication) or similar data carrying system. The in-home electricity grid is used in combination with a first privacy function to securely bind the LED light source 25 and the smart meter 20 and in order to guarantee privacy and security for the user.

The first privacy function is implemented to ensure that control signals are bound to a single home 2 and for performing an authenticity protocol that securely binds the end-point devices within a house (pairing between smart meter 20 and devices) uniquely to the applicable smart meter 20. This can be realized by including an inductive filter, a low-pass filter for example, in the smart meter 20. The inductive filter prevents any signals modulated on the in-home electricity grid (Examples of technologies utilizing this are X10 and Ethernet over Power) to leak outside the home 2. Using this filter allows for secure pairing of smart end-point devices 21, 22, 23, 24, 25 with the smart meter 20. After this pairing, also other means of communication protocols, such as wireless ZigBee™ can be used.

ZigBee™ technology for smart energy profile or similar technology can be used for the communication between the end-point device and the smart meter 20 on the one hand and between the smart meter 20 and the grid on the other hand. The features of this technology include: basic metering, demand response and load control, pricing, text messages and support for management systems. ZigBee™ technology offers security and authentication to allow consumer only, utility only or shared network control of information flow. The following features may be offered when using this technology:

Authenticity, which ensures that the data and transaction is genuine,

Integrity: data cannot be modified without authorization,

Non-repudiation: the home owner cannot deny receiving the energy,

Confidentiality of the communication channel: the amount of consumed energy should be protected.

ZigBee™ offers both security and authentication when implemented with AES-CCM with 32, 64 or 128 block length. Other security features offered by ZigBee security include: protection against reply attacks and offers access control lists (lists of nodes with which a node is prepared to communicate).

Referring to FIG. 3, after the initial step S0 of pairing, a session initiation S1 may be optionally executed. Parameters for the session are negotiated. The LED light source 25 may only function in combination with a certain subscription or subsidized-models. Session initiation S1 thus starts after pairing but before usage. LED light source 25 and smart meter 20 here exchange capabilities and requirements as part of this protocol, e.g. the LED light source 25 can report its capability to report useful usage and if it is subsidized.

Typically, sessions will only be valid as long as the LED light source 25 or similar end-point device remains connected to the same wiring 17 (i.e. same electricity path or in-home electricity grid). The latter may be supported by an optional Heartbeat (keep-alive) protocol with continuous exchange of time-limited authorization credentials.

During a session, the LED light source 25 reports to the smart meter 20 about usage, usefulness, state of the lightening function and associated sensors, etc. Optionally, certain end-point devices may also report the amount of energy they expect to use in a future period. The reporting S2 may be regularly updated during a session. As shown in FIG. 3, the smart meter 20 may send control signals to the LED light source 25 and to smart appliances or other end-point devices, e.g. to indicate that the network suffers a high load and that in accordance to the subscription plan one or more of the end-point devices should lower its energy consumption for low-priority usages. In this last example, higher priority is associated to at least one end-point device and a lower priority is associated to another end-point device. Accordingly, when needs for electricity are high as compared to production capabilities of the network, the server 10 can immediately transmit a control signal to the smart meter 20, which in turn send a power reduction command to the device of lower priority during the control step S3. Such a decrease of electricity consumption related to the end-point device having the lower priority does not impact the user who benefits from the other end-point devices of higher priority. Alternatively or additionally, the smart meter 20 may convert the control signal into a power reduction recommendation with respect to one or more of the end-point devices of lower priority. Such a recommendation is displayed and/or a warning function may prevent the user who can freely choose to switch off a given appliance, a light source, etc. The user interface 32 of the smart meter 20 can be used to parameter the respective priorities according to the personal needs of the user. Additionally or alternatively, the indicators of usefulness can be used to dynamically update the hierarchy of the priorities. In other words, a management of the priorities can be performed by the smart meter 20.

Referring to FIG. 3, a grid report S5 and a grid notify S5 form two communication steps performed between the server 10 and the smart meter 20. After receiving by the communication circuitry status information and one or more indicators of usefulness related to an end-point device, here the LED light source 25, the smart meter 20 reports to the server 10:

current usage, usefulness, and optionally, expected use and/or other agreed parameters to the utility company.

The service provider associated to the server 10 notifies, in a grid notify step S5, a grid status and may offer updated tariff plans in relation to the requested future energy use in response to an expected use reported in step S4. In other words, billing for electricity consumption is dependent on the monitoring data and can be dynamically updated. Before transmission to the server 10, the secure microcontroller 36 of the smart meter 20 processes the status information and the indicator of usefulness to produce monitoring data. The monitoring data, in combination with consumption data are then transmitted to the server 10. As above mentioned, the data transmitted by the smart meter 20 reflect current usage, usefulness and optionally expected use and/or similar parameter. The smart meter 20 is further arranged to enforce privacy policy and may apply conventional privacy enhancing technologies.

Information collected in-home is securely sent to the server 10 of the utility company or similar service provider. A second privacy function, implemented in the smart meter 20, here controls what information is sent to the server 10. This may be subject to preferences of the user and possibly the applicable contract (subscription). Inputs on the user interface 32 may be taken into account for management of this second privacy function. Privacy enhancing technologies applied include reporting frequency, averaging, masking, etc. It should be noted that this may apply to reporting to energy used as well as estimations on energy that is to be used (e.g. to charge an electric vehicle somewhere during the night, etc.). Power characteristics and time information about the end-point device may be used by the smart meter 20 for estimation of energy consumption, i.e. expected use, related to one or more of the end-point devices. The second privacy function also preferably has a limited security function, which is to authenticate incoming signals from the grid as originating from the utility company.

After receiving the grid notify in step S5, the smart meter 20 can use the grid status and the updated tariff plans to send via the LAN interface 37 appropriate control signals to the end-point devices. To manage this, the smart meter 20 comprises memorization areas for storing the updated data from the utility company and an algorithm processed by the microcontroller 36 and using the stored updated data to take the energy cost and priorities for energy consumption into account.

Referring to FIG. 1, the end-point devices 21, 22, 23, 24, 25 may also be provided with privacy function, which is responsible for some basic privacy functionality at the individual appliances 21-24 and the LED light source 25. In one exemplary embodiment, communication of the end-point devices with the smart meter 20 is performed using a control of the data reported to the smart meter 20. A per-device privacy policy is enforced so as to operate this control, for instance in a similar way to the second privacy function used at the smart meter 20.

Information communicated to the smart meter during the report session S2 (FIG. 3) typically contains information on the status of the appliance (ON/OFF/etc.), energy usage and energy usage patterns, and sensor information (presence, temperature, ambient light level, etc.), which may provide an indication to usefulness. Additionally, one or more keys for authentication may be used. Agreement on key material is obtained during initial step S0 of pairing. A limited security function can thus be used for authentication of signals sent to the smart meter 20 as originating from the end-point device. Pairing between the smart meter 20 and a given end-point device allows indicator of usefulness and status information to be associated with electricity consumption data (for this given end-point device). The smart meter 20 may operate according to one or more modes, at least one of which enables automatic adjustment of electricity consumption. Alternatively, the smart meter 20 may only collects the per-device quantitative and qualitative data, without actuating any change in the electricity consumption of the end-point devices.

Although embodiment shown in FIG. 3 shows LED light source 25 provided with a detection unit able to detect non-occupancy in a room, it should be understood that end-point devices can be equipped with a large variety of sensors and collecting elements for determining an indicator of usefulness. Indeed, as an alternative for the lamps one can think of various appliances that can be used in an energy saving (useful) or an energy spoiling manner (not useful). Taking the example of a washing machine 21 or a dishwasher 22, usefulness can be determined by measuring the quantity of dirt and the degree of loading the machine. A load sensor and/or a water transparency sensor can thus be provided for performing the measurements.

Taking the example of a charging device 24 designed to charge batteries of an electrical vehicle, such a device 24 can be optionally associated with a data recorder for collecting information about the driving style during a longer period of time. The charging operation is performed during night for a lower tariff. A summary of the time data and optional vehicle driving data is communicated to the smart meter 10.

Here, the end-point device is selected from the group of electrically powered devices. For instance, this group essentially consists of a domestic appliance 21, 22, 23, a device for charging batteries 24, an air conditioning appliance, a pump, a light source (and preferably a LED light source 25) or any other similar device.

According to one variant, the end-point device has flexibility in when it will consume (most of) its energy and reports this to the smart meter 20. For instance, the washing machine 21 can do the laundry during the night, i.e. in a time slot with a lower tariff. The smart meter 20 forwards the request to the server 10 of the utility company and in response obtains a signal when the request is assigned (e.g. in the form of a time slot that the energy may be consumed). Such a control will typically involve getting the energy on economic favorable terms, i.e. a discount.

A control of the consumption may be performed by a number of end-point devices. This control example covers the assignment of time slots for claimed energy use, e.g. when an electric vehicle may be charged. The charging device 24 as shown in FIG. 1 may be provided with a communication module allowing the charge to be performed in a predetermined time slot. Actuation of the charge is for instance responsive to a command signal from the smart meter 20. More generally, such an end-point device will be powered after receiving at the smart meter a response from server 10. in reply to the request. Such a request may be automatically transmitted by the smart meter 20 when a user command is input via an interface of the end-point device. One advantage of this control of electricity consumption is that expected energy use may be reported. Of course such reporting should not reveal too much privacy sensitive information to the utility company or otherwise and the second privacy function as above described limit extent of information transmitted to the server 10.

One further application of the energy metering system as shown in FIG. 1 is exploitation of accurate information about the amount of energy used by LED light source devices 25, for example to incite the consumer to replace the conventional lights by lamps provided with LED technology. The payback of an investment in LED technology results from a much lower energy consumption and longer lifetime of the LED. As a consequence it may take some years before breakeven is reached. As such a replacement is a substantial investment, exploitation of the monitoring data for adapting related electricity tariffs could encourage the adoption of LED technology despite the time necessary to recover the investment is a "light-license" business model.

For instance according to a "light-license" business model, the LED light source devices 25 are given for free and the price of the electricity is slightly increased. The money paid on top of the normal price is used to pay for the LED lightening. In total the consumer saves money due to the fact that the LED light source devices 25 use much less energy. To implement such a model, the electricity company or a third party (optionally the LED manufacturer) may apply specific tariffs. An indicator and/or an information status can be associated with each new installed LED light source device 25, so that the smart meter 20 takes into account specificity of the amount of electricity consumed by these LED light source devices 25. The amount of electricity used by the LED light source devices 25 has to be collected correctly by the smart meter 20. This amount of used electricity can be determined in various ways such as measuring the time of light production multiplied by the known power of the LED light source device 25.

As connection between the new lamp and the smart meter 20 is secure and reliable, this prevents errors and fraud. The consumer should not be able to install and use a free LED light source device 25 without smart meter installed. For instance, according to this the "light-license" business model, the LED lightening cannot function LED light source device 25 is not connected and recognized by the smart meter 20. The LED light source device 25 used in this model can be as described with respect with FIG. 3 and may further comprise in the communication module 25c an activating routine that enables LED lightening only after receiving an acknowledgement message from the smart meter 20.

Although the energy metering system shown in FIG. 1 is used in a home 2, it should be understood that such a system can be installed in a office building or similar settings as well. To give increased incentive to behave in a responsible way regarding the electricity consumption, advanced occupancy detection can be provided not only to distinguish between useful and wasted resources, but also to determine who profited from the electricity resources. In such a configuration, the end-point devices in the office building are associated to different consumers and are respectively interfaced with the communication circuitry 31 of the smart meter 20. Distinct identification information are preferably used for the different consumers for communication with the smart meter 20, whereby the server 10 associates only one of said consumers to the monitoring data related to one given end-point device of said end-point devices. The billing system associated to the server 10 will consider a plurality of accounts, thus avoiding a central payment for usage of the resources in an office building or the like.

Monitoring data can be collected with accuracy to indentify wasteful behaviour, using measurement data and status information. Wasteful behaviour can be determined in view of the indicators of usefulness in particular, and the consumer behaviour can be billed on a more fine-grained level. As a result, the energy metering system heightens every individual sense for responsibility.

The energy metering system is also adapted to be used for monitoring an outdoor lighting system. Energy cost for outdoor is a major cost point for communities, yet also an expense with a massive waste of energy. By collecting long term usefulness statistics, communities can optimize the light schedules. For smaller streets, infrastructure can be saved by connecting outdoor lights to residential houses (many of which have some outdoor light anyhow), and reimburse power costs caused for the benefit of the community. In this case, energy consumption from the end-point devices that belong to residential houses is monitored by the smart meter 20. Steps S1-S5 shown in FIG. 3 may be performed so that the service provider collects all the pertinent data required for estimating reimbursement cost.

Many applications of the energy metering system could be aimed towards preventing overuse of environmental resources. Indeed, this system may provide a powerful way of shaping consumer behavior towards more environmentally sustainable patterns. The energy metering system may advantageously respect user priorities and simply uses measurement data and external information to give financial (or other) incentive for sustainable behavior.

The present invention has been described in connection with the preferred embodiments. These embodiments, however, are merely for example and the invention is not restricted thereto. For example, even though the preceding examples were based only on electricity measuring system, this can also apply for systems measuring the consumption of other resources like gas, water, heat to obtain a smart consumption of this resource. It will be understood by those skilled in the art that other variations and modifications can easily be made within the scope of the invention as defined by the appended claims, thus it is only intended that the present invention be limited by the following claims. Although information status is presented above as information distinct from the indicator of usefulness, it should be understood that such information status may be extracted from the indicator or vice versa. Thus, the information status should not be interpreted in a restrictive manner.

Any reference sign in the following claims should not be construed as limiting the claim. It will be obvious that the use of the verb "to comprise" and its conjugations does not exclude the presence of any other elements besides those defined in any claim. The word "a" or "an" preceding an element does not exclude the presence of a plurality of such elements.

The invention claimed is:

1. A method for billing a utility customer using a resource metering system in communication with a server, a smart meter, and an end-point device consuming a resource, the method comprising the steps of:
pairing the smart meter with the end-point device using power line communication,
producing, in a detection unit, data about the end-point device, said data including status information and at least one indicator of usefulness, wherein the status information includes a power reading and the at least one indicator of usefulness includes a presence sensor reading;
transmitting, by the end-point device, the data to the smart meter; in the smart meter,
filtering power line communication signals between the smart meter and the end-point device to enable a secure pairing of the smart meter and the end-point device;
communicating with the server using communication circuitry via a first interface and communicating with the end-point device using the communication circuitry via a second interface, wherein the second interface receives status information from the end-point device and at least one indicator of usefulness of the end-point device, and the first interface transmitting the data to the server;
determining a quality level of resource consumption based on the power reading and presence sensor reading;
providing, using a metrology device connected to a medium, the resource to the end-point device;
collecting, using a control circuitry connected to the metrology device, resource consumption data representative an amount of resource consumed by the end-point device, the control circuitry being connected to the communication circuitry and produces monitoring data that is transmitted to the server after processing the status information and said indicator of usefulness; and
generating, using a processor, a warning indicator to a customer that reflects energy use associated with resource consumption and the quality level of resource consumption for the end-point device, wherein the warning indicator relates to spoiled energy and/or an amount of spoiled energy consumed in association with a date and a time; and
modifying a resource consumption price of the spoiled energy.

2. The method of claim 1, wherein the monitoring data transmitted to the server by said smart meter, represents data about usefulness of the resource consumed for the end-point device.

3. The method of claim 1, wherein said indicator of usefulness of the end-point device and corresponding status information are processed by the smart meter to determine if the end-point device is used in a resource saving manner.

4. The method of claim 1, wherein resource consumption rate characteristics and time information about the end-point device are used for estimation of resource consumption related to said end-point device.

5. The method of claim 1, wherein the end-point device is associated with a first priority and a second end-point device is associated with a second priority, a control signal from the server being received by the smart meter and converted into at least one of:
 a resource consumption reduction recommendation, and
 a resource consumption reduction command,
for reducing resource consumption of the second end-point device having the second priority.

6. The method of claim 5, wherein a hierarchy between the first and the second priority is dependent on the monitoring data.

7. The method of claim 1, wherein status information and said indicator of usefulness are transmitted to the communication circuitry of the smart meter by a communication module of the end-point device, signals transmitted between the communication module and the communication circuitry includes identification information, so as to ensure correct billing to the utility customer.

8. The method of claim 1, further using said indicator of usefulness to determine that the resource is consumed in excess for the end-point device.

9. The method of claim 8, including notifying a consumer, by the first or second interface of the smart meter or the end-point device, of the amount of spoiled energy consumed.

10. The method of claim 1, wherein a report session is started between the end-point device and the smart meter after transmission by the end-point device to the smart meter of data reflecting a capability to report usefulness.

11. The method of claim 1, wherein the end-point device is powered when a response from the server in reply to a request from the smart meter is received by the smart meter, said request being automatically transmitted after a command input of a user on an interface of the end-point device.

12. The method of claim 1, wherein the metering system includes a plurality of end-point devices and each end-point device is associated with different customers, wherein each end-point device is respectively interfaced with the communication circuitry of the smart meter, distinct identification information being used for the different customers for communication with the smart meter, whereby the server associates only one of said different customers to the monitoring data related to one end-point device of the plurality of end-point devices.

13. A customer billing system for use by a utility company, the system comprising:
 a resource metering system in communication with a server, the resource metering system comprising:
 a smart meter;
 an end-point device consuming a resource, the end-point device comprising:
  a detection unit produces data about the end-point device, said data including status information and at least one indicator of usefulness, wherein the status information includes a power reading and the at least one indicator of usefulness includes a presence sensor reading; and
  a power line communication module for transmitting to said smart meter data produced by the detection unit per power line communication;
 the smart meter comprising:
  a filter to filter power line communication signals between the smart meter and the end-point device to enable a secure pairing of the smart meter and the end-point device;
  a communication circuitry comprising a first interface for interfacing with the server and a second interface for interfacing with said end-point device, the second interface receiving from said end-point device status information and the at least one indicator of usefulness of said end-point device, and the first interface transmitting data to the server;
  a metrology device connected to a medium that provides the resource to the end-point device; and
  a control circuitry connected to the metrology device for collecting resource consumption data representative of an amount of resource consumed by the end-point device, the control circuitry being connected to the communication circuitry and to produce monitoring that is transmitted to the server after processing the status information and said indicator of usefulness; and
  a processor for determining a quality level of resource consumption based on the power reading and presence sensor reading, and generating a warning indicator to a customer that reflects energy use associated with resource consumption and a representative of a quality level of resource consumption for the end-point device, wherein the warning indicator relates to spoiled energy and/or an amount of spoiled energy consumed in association with a date and a time and modifying a resource consumption price of the spoiled energy.

14. The method of claim 1, wherein the determination of the quality level of resource consumption for the end-point device includes providing information related to the resource consumption price of the spoiled energy.

* * * * *